United States Patent [19]

Link

[11] Patent Number: 4,966,472
[45] Date of Patent: Oct. 30, 1990

[54] ROLLER BUSHING

[76] Inventor: Larry R. Link, 906 Huntsmoor Dr., Frankfort, Ill. 60423

[21] Appl. No.: 380,859

[22] Filed: Jul. 17, 1989

[51] Int. Cl.$^5$ .............................................. F16C 33/66
[52] U.S. Cl. ..................... 384/474; 267/267; 384/548
[58] Field of Search ............... 267/267, 268, 271; 384/456, 462, 474, 489, 548, 581, 586, 220, 401

[56] References Cited

U.S. PATENT DOCUMENTS

| 1,257,197 | 2/1918 | Dowd | 384/401 |
| 1,872,814 | 8/1932 | Riblet | 267/267 |
| 2,251,843 | 8/1941 | Jones | 267/267 X |
| 2,333,183 | 11/1943 | Jones | 267/267 |
| 4,003,562 | 1/1977 | Kaiser | 267/268 |

FOREIGN PATENT DOCUMENTS

| 557253 | 8/1923 | France | 267/267 |
| 1186430 | 4/1970 | United Kingdom | 384/220 |

*Primary Examiner*—Thomas R. Hannon
*Attorney, Agent, or Firm*—Fitch, Even, Tabin & Flannery

[57] ABSTRACT

A roller bushing assembly for use in a vehicular leaf spring suspension system pivotally supports an end of a leaf spring so as to minimize transmission of roadway induced shock and vibration loads to the vehicle and driver. The roller bushing assembly includes a tubular housing containing roller bearings for support of a shaft which is connected to a vehicle chassis. Free flexure of the spring is facilitated by providing low friction pin connections that minimize resistance of the vehicle/spring connections to rotation of the spring ends and extension and contraction of the spring.

9 Claims, 2 Drawing Sheets

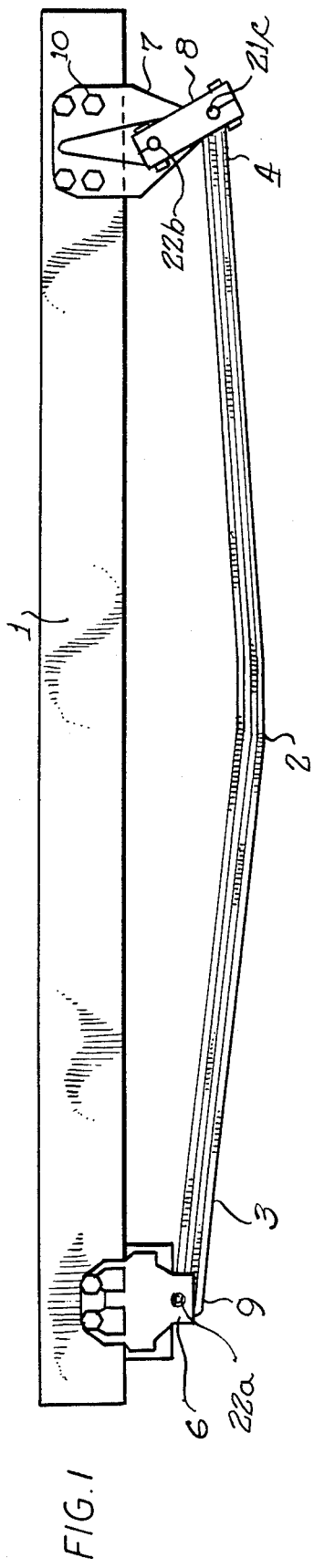
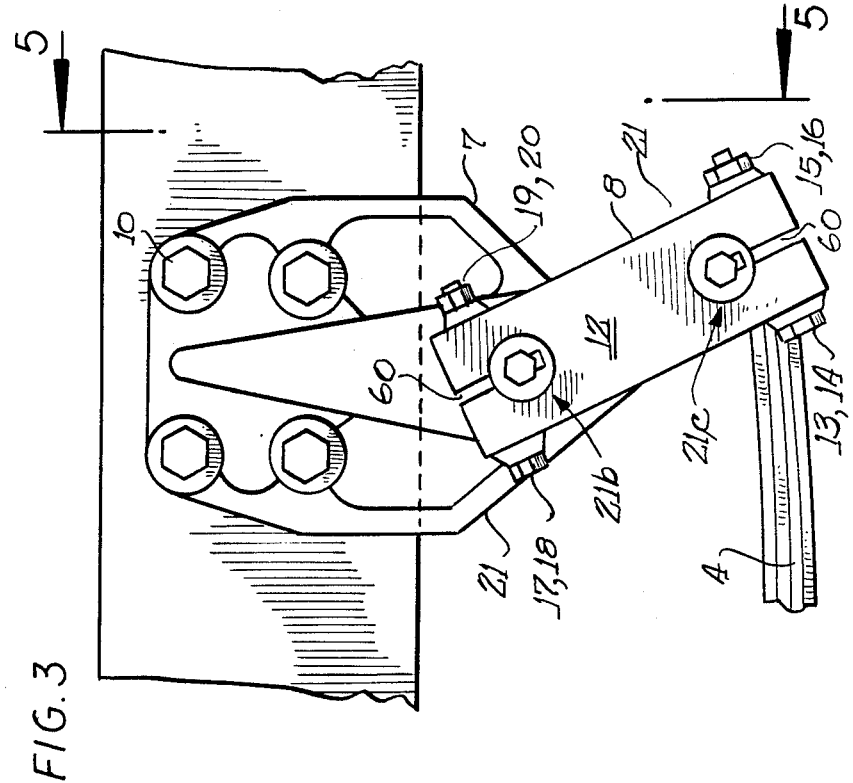
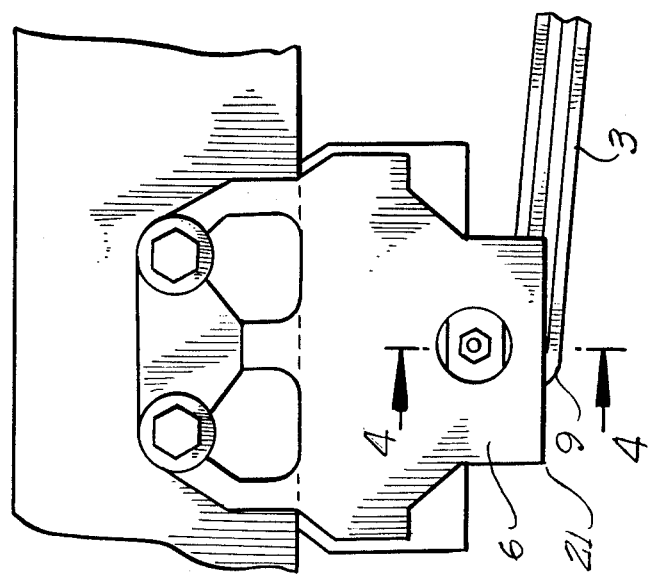
FIG. 1
FIG. 3
FIG. 2

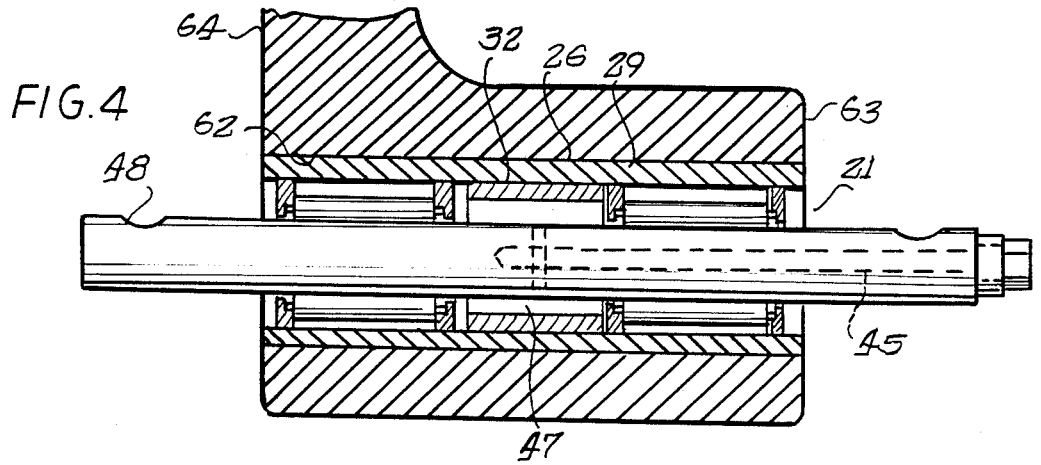
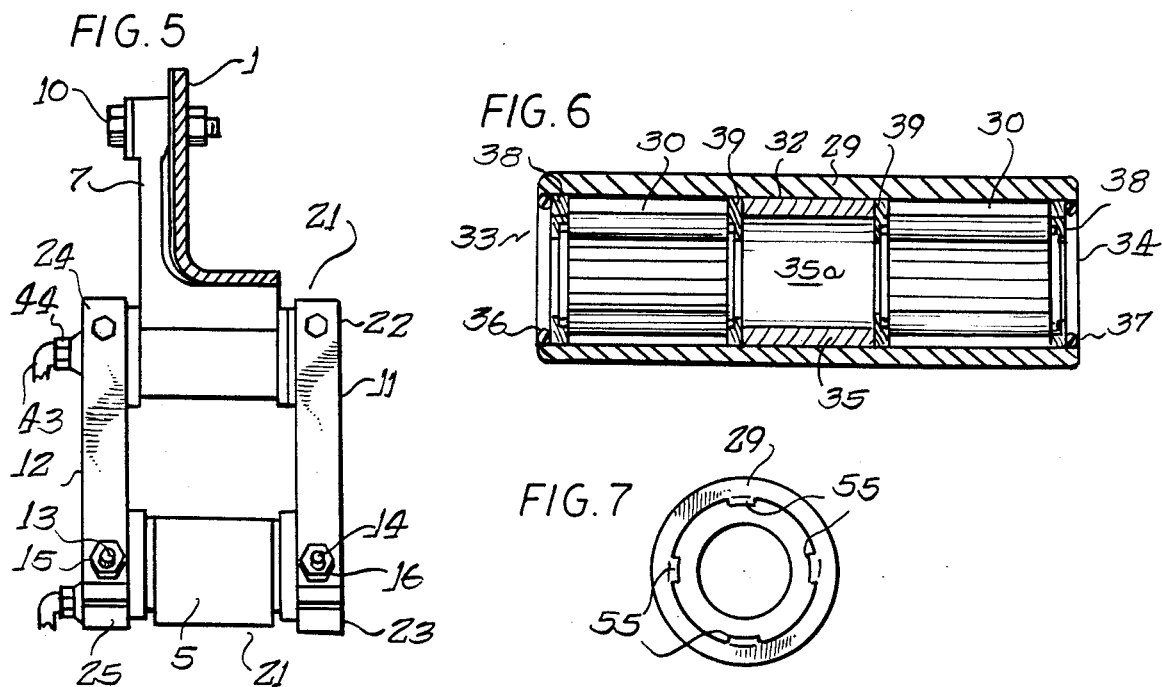
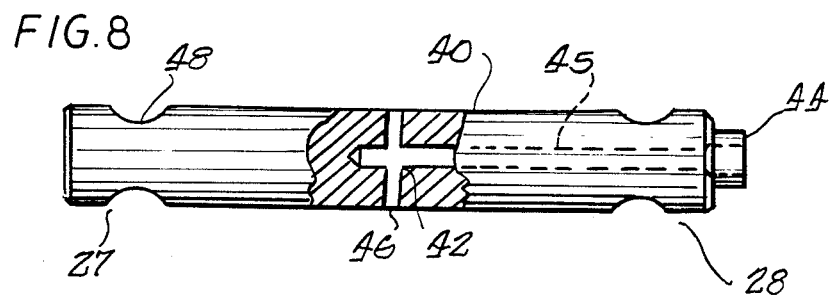

ROLLER BUSHING

BACKGROUND OF THE INVENTION

The present invention relates to an improved truck spring suspension system and to bushings which may be used therein either to attach a spring shackle to a truck chassis or to attach a leaf spring to a truck chassis bracket or a spring shackle.

Heavy trucks must have suspension systems of sufficient strength and stiffness to support the vehicle and its cargo under whatever highway conditions they might encounter. Historically suspension systems satisfying these requirements have not satisfactorily attenuated roadway induced shock and vibration. A very stiff suspension system reduces the usable life of a vehicle because roadway induced shock and vibration loads are not isolated from the truck's critical components; if a suspension system is not designed properly or does not function as designed the input loads can be greatly amplified by the truck frame and other structure, including an overly stiff suspension system. Conversely, a more flexible suspension system acts to isolate roadway inputs from a truck's critical components. More importantly, not only is the fatigue life of a truck itself reduced by an overly stiff suspension system, the truck's driver is also subjected to vibratory and shock environments which result in his premature fatigue and exhaustion. Even more serious than the driver's temporary discomfort is the possibility of an accident resulting from the driver's fatigue. A still further concern is long-term damage to the driver's health.

The truck manufacturing industry has produced relatively good smooth-riding truck suspensions when the truck is new with a combination of tires, springs, air-cushion suspensions and other types of shock absorbers. The problem is that such smooth-riding characteristics often are lost quite early in the life of the truck, e.g., 50,000 miles or less. The present invention is directed to a way to maintain the operational characteristics of a properly functioning leaf spring suspension system after extended periods of use and even after missing a spring pin and bushing lubrication cycle. Also, the present invention achieves the result of requiring minimal design and manufacturing changes for original equipment applications as well as being particularly well suited to retrofit applications. Retrofit is very economical and requires no significant structural alterations. Installing the present invention into a suspension system having prior art bushings is not much more difficult than replacing the existing bushings.

Prior art leaf spring suspension systems have used brass or other similar solid-section type bushings to allow oscillatory motion of the spring pivot points. These bushings, however, were susceptible to accelerated wear and exhibited binding behavior if they were not frequently lubricated. Recommended lubrication intervals for solid-section type bushings in heavy truck suspension applications are about every 2500 miles. However, such suspensions actually get lubricated no more frequently than about every 5000 miles. Once the bushing is "run dry" the ostensibly pivoting connection rapidly degrades in performance. The spring ends are not as free to rotate as they would be under ideal conditions. At this point the spring ends move from semi-simply-supported to semi-cantilevered boundary conditions and the undesirable manifestations of a fixed-end spring result.

The present invention is directed to producing a bushing assembly that solves the spring bushing freeze-up problem. The invention provides a spring bushing requiring less scheduled maintenance while providing a smoother ride.

Bearings have not previously been used in spring shackle applications because of a number of significant problems, which are solved by the present invention. Loads transmitted through spring bushings in heavy truck suspensions are quite high. Bushing loads can be 3,000 lbs. or higher under simple static loading conditions. Rough roads cause even higher dynamic loads. To withstand such loads, a ball bearing type bushing would be massive, probably 4 to 5 inches in diameter. Without major redesign, current leaf spring suspension systems could not accommodate such large bearings.

To be usable in current systems, a bearing must be compact. However, compact bearings of any type generally require precisely machined contact surfaces. This requirement is at odds with the typical construction and installation of spring shackle bushings. Spring leaf eyes are not machined to close tolerances and can therefore damage a spring shackle bushing sleeve. If such damage occurs, the bearing is subjected to localized frictional loading because of binding, warping, or indentation of the bearing contact surfaces.

A further problem with use of bearings in spring shackle bushings concerns the type of loading they encounter. Whereas bearings do a reasonably good job of distributing high speed rotary loads evenly among all the rolling elements even with loose tolerances, spring shackle bushings experience only oscillatory motion caused by essentially vertical input loads. The unidirectional nature of the input loads combined with loose tolerances causes pounding in a spring shackle bushing. The result is that the load is amplified and unevenly distributed; because of the unidirectional loading some parts or elements carry more than a proportionate share of the total load and, because of the loose tolerances these already highly stressed elements experience an even greater load. The pounding forces due to vertical input loads and loose tolerances result in extremely high stresses in just a few of a bearing's rolling elements.

A theoretical explanation of the functioning of a suspension system having frequency and damping characteristics sufficient to effectively isolate the truck and driver from roadway induced shock and vibration loads will now be given. If the suspension system's natural frequency is sufficiently lower than the fundamental frequencies of the truck and its major components, the suspension system acts as a shock and vibration isolator for the rest of the vehicle. A low frequency isolator works by transforming mechanical energy into thermal energy. At the frequency at which this transformation occurs, the suspension system's natural frequency, the isolator does not reduce the magnitude of the input load (the load is actually amplified). However, the vibration and shock amplification in a properly designed and functioning isolation system occurs at a frequency that does not coincide with the natural frequency of any critical component. Mechanical energy is dissipated at a frequency that does not excite structural resonances of any critical vehicle components. Further, the input load is generally amplified by no more than a factor of three at an isolator resonance, as opposed to much greater amplification at structural resonances in nonisolated systems. At frequencies greater than the isolator natural frequency the isolation system's transmissibility curve "rolls off." That is, the isolator works to reduce the magnitude of input loads at higher frequencies. In other words, at the natural frequencies of the vehicle or its critical components, the effect of isolation is to attenuate shock and vibration loads. The higher frequency loads are actually reduced in amplitude. This desirable result is diametrically opposite to the result in a nonisolated system. In a nonisolated system any input loads are amplified by the structure at the point where the input load frequency coincides with the structure's natural frequency. Amplification of input loads in nonisolated structures similar to trucks is frequently in the 20X (input load magnified by a factor of 20) range, but can be much greater, depending on the inherent hysteresis damping of the particular structure and material.

To effectively attenuate roadway induced shock and vibration loads, a suspension system must be sufficiently flexible and contain sufficient damping properties to either transform the mechanical energy into another form (heat) or store it momentarily for slower release into the vehicle. Effective shock isolation transforms a short duration shock pulse of high amplitude into a longer duration pulse of lower amplitude, the total energy transmitted into the vehicle being the input mechanical energy minus the mechanical energy converted into heat by the isolating medium.

The effect of spring pin freeze-up is to transform an initially pin-ended spring into a cantilevered spring. The result is to increase the natural frequency of the suspension system and thereby reduce the ability of the suspension system to effectively isolate shock and vibration loads from the vehicle and driver. A cantilevered beam of the same cross section and material as a simply supported beam is stiffer and hence is not as proficient at shock and vibration isolation. This is true partly because the natural frequency of a cantilevered beam is higher than for a simply supported beam and hence the attenuating effect at the vehicle structural resonances is not as great (the transmissibility curve has not "rolled off" at the vehicle structural resonances as much as it would have for the lower frequency simply supported condition). But a simply supported leaf spring is also a better isolator because the particular design of a leaf spring allows for relative movement between the spring leaves. This relative movement produces frictional damping. Therefore, the more a leaf spring flexes, the more it damps vibration and shock inputs. Further, low friction pin joints have superior damping properties as compared to rigid, nonpivoting connections, which have no damping propensity beyond whatever internal hysteretic effect might occur.

The undesirable aspects of a fixed-end leaf spring are not confined to the deleterious fatigue effects such springs have on trucks and drivers. For identical input loads, the maximum stress in a cantilevered leaf spring is greater than in the same spring with freely rotating ends. The reason for this difference lies in the particular construction and method of attachment of a leaf spring. The maximum bending moment in a simply supported leaf spring occurs at the midpoint, where the roadway load is transmitted into the spring. However, the maximum bending moment in a fixed-end leaf spring occurs both at the midpoint and at each end. By maintaining free rotation of the spring ends, excessive bending moments at the spring ends are prevented. This is important because in most leaf spring applications the load at each end of the spring is transmitted through only one leaf. Even though the maximum bending moment in a simply supported beam exceeds the maximum bending moment in a fixed-end beam, moving the maximum bending moment to the center of a leaf spring reduces the maximum stress. This occurs because the cross section and hence area moment of inertia is greater at the center than at the ends. Several spring leaves are stacked at the center, and although they are not rigidly connected, the frictional forces between leaves produce a composite moment of inertia exceeding that of a single leaf. Therefore, a simply supported leaf spring is less likely to break at the ends because the effect of free spring end rotation is to move the maximum bending moment to the center, where the spring can better handle the load. Even if the spring does break under excessive loading, in a simply supported spring the failure will most likely occur near the center. However, the failure will not be catastrophic. The initial failure will occur in only a few leaves, giving the driver a warning that total failure is imminent. This scenario is to be contrasted to the situation where spring bushing freeze-up causes breakage near the end. In the latter situation, if the spring is of the type that has only one leaf carrying the total load at the attachment points, catastrophic failure results, including loss of steering and possible rollover.

As can be easily appreciated from the preceding discussion, any device or method for maintaining the flexibility of a leaf spring suspension system will greatly reduce vehicle and driver fatigue as well as the possibility of catastrophic failure of the spring itself. However, even though the aforementioned structural static and dynamic behavior of a leaf spring suspension system was well known, prior attempts to provide a smooth-riding suspension system that was strong and stiff enough to support heavy loads did not solve the problem of spring pin and bushing freeze-up, nor did they provide economical alternative solutions.

A principal aspect of the present invention is to provide an improved spring shackle bushing for heavy truck suspensions and related applications.

A further aspect of the invention is to provide a truck suspension with improved riding characteristics over a substantially longer period of time than obtained with conventional suspensions.

A further aspect of the present invention is to provide an improved spring shackle bushing that reduces frictional forces in leaf spring suspension pivot points.

A further aspect of the present invention is to provide an improved spring shackle bushing that uses roller bearings in combination with very hard and precisely machined bearing contact surfaces to produce low friction leaf spring suspension pivot points.

BRIEF DESCRIPTION OF THE DRAWINGS

FIG. 1 is a side elevation view of a leaf spring suspension, system.

FIG. 2 is a side elevation view of a leaf spring forward end chassis bracket.

FIG. 3 is a side elevation view of a leaf spring rear chassis bracket and spring shackle assembly.

FIG. 4 is a front elevation sectional view of the preferred embodiment showing the roller bushing cartridge inserted into a leaf spring rear end chassis bracket.

FIG. 5 is a rear elevation view of a leaf spring rear end chassis bracket and spring shackle assembly.

FIG 6 is a front elevation sectional view of the preferred embodiment showing the roller bushing sleeve and bearings.

FIG. 7 is a side elevation view of the preferred embodiment showing the roller bushing sleeve and bearings.

FIG. 8 is a front elevation view of the preferred embodiment showing the spring shackle pin with a cutaway portion to reveal the lubricant delivery duct.

DETAILED DESCRIPTION OF THE PRESENT INVENTION

Reference to the drawings shows that the present invention is intended to replace solid-section type shackle pin bushings in leaf spring suspension systems. A principal aspect of the present invention is that its use does not require significant alteration of existing suspension system designs. The differences between the present invention and prior art spring shackle bushings lie within the spring bushing cartridge itself, the overall appearance of a leaf spring suspension system is not changed. Thus, FIGS. 1, 2, 3 and 5 appear no different than they would for a description of prior art brass bushings. A leaf spring suspension system acts to absorb and isolate roadway induced shock and vibration so as to provide a less fatiguing environment for a truck and its driver.

Referring to FIGS. 1, 2, 3, and 5 it can be seen that a leaf spring 2 is connected to a chassis rail 1 by a forward end chassis bracket 6 at the forward spring end 3 and by a rear end chassis bracket 7 in combination with a spring shackle assembly 8 at the rear spring end 4. The chassis brackets 6 and 7 are attached to the chassis rail 1 by bolts 10. The front spring end 3 is attached at a front spring eye 9 to the front chassis bracket 6 by a bushing 21a. The rear spring end 4 is attached at a rear spring eye 5 to the spring shackle assembly 8 by a bushing 21c. The spring shackle assembly 8 is attached to a rear chassis bracket 7 by a bushing 21b.

The present invention incorporates the spring shackle concept but goes beyond prior art in that it provides less frictional resistance to spring end oscillation and does so for extended service intervals.

The present invention provides an improved spring shackle bushing for heavy truck suspensions and other related applications The bushing 21 has roller bearings 33 and 34 with highly polished and precisely machined bearing contact surfaces to produce a bushing that requires minimal maintenance while allowing the spring ends to rotate freely. A bushing housing 29 for internal bearing elements 41 is very hard and stiff so as to resist conforming to imperfections in the spring and vehicle mount structures. This prevents transmission of excessive frictional, warping, or binding loads to the bearing elements which allows the bearing housing, bearings, and a precisely machined and highly polished shaft 40 to cooperate in producing a pin connection with low torsional stiffness, which is essential to proper performance of a leaf spring suspension system. Further, the invention includes means for lubricant retention to provide extended service intervals.

In carrying out the principles of the present invention in accordance with a preferred embodiment thereof, the spring shackle bushing 21 has been developed for maintaining free spring end rotation for a long service life with a minimum of maintenance. The preferred and illustrated roller bushings 21 provide a longer maintenance-free period of operation than the standard, conventional brass bushings which should be lubricated every 3,000 to 5,000 miles. This is achieved by providing a large, internal lubricant or grease cavity 47 between a pair of internal roller bearings 33 and 34 in the bushing with grease in the cavity supplying grease even though a standard lubrication period is missed. While the roller bushings still need to be greased at regular intervals, the time between greasings may be extended without such harm to the bushing because of the large grease cavity supplying grease to the roller bearings.

In order to provide a low-cost bushing means 21 which will compete in cost with brass bushings and which will sustain a smooth low friction oscillating movement for an extended time period, the roller bushing means preferably includes a hard metal outer housing 29 which is highly polished as is the internal shaft 40 rotating within the roller bearings 33 and 34. Both the internal shaft and the outer housing, which is preferably a cylindrical sleeve, are precisely machined to tolerances and are highly polished. The bearings have an outer annular race 30 and 31 which are press fitted into the sleeve so that the sleeve and the races are combined into what acts as almost a composite race for the internal bearing elements. The outer housing thus in effect assures that the races 30 and 31 are sufficiently strong and smooth that over the life of the bushing the internal bearing elements run between two very smooth and precise surfaces with rolling contact that will not damage the bearings themselves. This smooth rolling contact results in reduced friction. The preferred material for the outer housing sleeve is tool or bearing steel which is harder than the spring metal of the spring eye encircling the sleeve. This hard smooth outer sleeve surface prevents imperfections or rough surfaces in the spring ends from being transferred; and from being concentrated or localized and causing bear loads that would damage the roller bearings. Because these precision machined hard surfaces on the housing and internal shaft retain the bearings therebetween, low cost and standard roller bearings may be used thereby avoiding the need for specialized, high cost roller bearings. Use of bushings in this manner allows the spring to behave as a true simply supported beam so long as the pin connections rotate freely. Behaving as a simply supported beam results in proper performance of a leaf spring suspension system in attenuating roadway induced shock and vibration loading.

Referring now in greater detail to the invention and to the drawings, it can be seen that the roller bushing cartridges 21, which are the principal elements of the present invention, are press fit into hollow bores in the rear chassis bracket 7 and the front and rear spring eyes 9 and 5, respectively, at the bearing housing outer surfaces 26. The roller bushing cartridges 21 are further attached to the front chassis bracket 6 and the tops and bottoms 22–25 of the inner and outer spring shackle links 11 and 12 at the spring bushing pin inner and outer attachment points 27 and 28.

The preferred housing 29 is in the form of a sleeve and made from a material harder than the spring eye and generally similar to the bearing material itself. The bearing housing in the preferred embodiment is made of ASTM 52100 bearing steel. Use of bearing steel prevents distortion during thermal expansion and contraction because the housing's coefficient of thermal expansion is matched to that of the bearings 33 and 34. Herein, the components are matched in thermal expansion and contraction properties. Without such matching, the benefits of extensive efforts to create a precision device can be lost, sometimes even if the temperature variation is only a few degrees. In truck suspension applications the combined effect of atmospheric temperature variation and transformation of mechanical energy into heat at the spring pivot points creates the possibility of accelerated bearing wear. The present invention takes precautionary steps such as matching thermal expansion coefficients so as not to impair precision low-friction operation of the spring bushing cartridges.

A further important reason for using bearing steel for the bearing housing 29 is that bearing steel is harder than spring steel. Use of bearing steel for the housing prevents spring eye or chassis bracket irregularities from causing localized frictional loading on the bearings because of warping, binding, or indentation of the outer bearing races 30 and 31. A very hard bearing housing is required because for the preferred type bearing, needle roller bearings, the housing of necessity is an element in a composite bearing race. THe bearing races 30 and 31 are very thin and hence could not adequately withstand heavy loads without the backup support of a stiff, hard, and highly polished bearing housing.

As can be seen by reference to FIGS. 4 and 6, in the illustrated bearing housing 29 is a right circular cylindrical tubular sleeve approximately 3 inches long and has outside diameter of approximately 1.2 inches and inside diameter of approximately 1.0 inches. The bushing housing size is varied for various sizes of trucks and manufacturers so that this size is merely illustrative.

The inner and outer surfaces 26 and 32 of the bearing housing 29 are precisely machined and highly polished. Both surfaces are machined to 60 to 65 micron standard scale finishes. All surfaces for bearing or bearing race contact, as well as the outer bearing housing surface 29, are machined to a roundness tolerance of 0.0005 inch.

The spring bushing cartridge inner and outer bearing assemblies 33 and 34 are disposed at either end of the bearing housing 29 so as to equally transmit the loading through the cartridge assembly from the spring to the chassis. The inner and outer bearing assemblies are separated by a spacer 35 which is also preferably made of ASTM 52100 bearing steel. However, the spacer 35 could be made of any material sufficiently rigid to maintain the bearings in their proper positions that also has a thermal expansion coefficient sufficiently close to that of bearing steel so as not to induce binding or warping of the bearings during thermal expansion or contraction. The spacer 35 contacts the inner bearing element retaining ring 39 of each bearing assembly on each of its ends. There are no particular tolerance or finish requirements for this spacer. Further, the bearings could be maintained in their proper places by a section of the bearing housing of smaller inside diameter than the rest of the housing. As can be appreciated, any method for assuring proper longitudinal alignment of the bearings that does not create thermal expansion or contraction problems is acceptable.

In the preferred embodiment all relative motion within the spring bushing cartridge 21 occurs at the bearing and shaft interface and where the bearing elements 41 engage the bearing races 30 and 31. This aspect of the present invention is critical; if relative motion occurs elsewhere (e.g., if the bearing races move in their housings) the precision operation of the present invention will be lost. In keeping with this design criterion the bearing assemblies 33 and 34 are press fit into the bearing housing 29. In the preferred embodiment the bearing assemblies are maintained in their positions abutting the spacer or other separating device by a permanent adhesive which bonds the bearing races 30 and 31 to the bearing housing inner surface 32. It is felt that this method of mounting is superior to any other in providing the necessary precision and proper bushing operation. It is obvious, though, that other types of retaining means (e.g., lock-ring) are well within the scope of the invention.

For precision operation over extended service intervals, contamination of the lubricant must be prevented. For this purpose rubber o-rings 36 and 37 are provided at each end of the bearing housing 29 for sealing the bearing assemblies 33 and 34 from foreign contaminants. The o-rings 36 and 37 sealingly engage the bearing housing 29, the outer bearing element retaining ring 38, and the spring bushing shaft 40. To retain the o-rings as well as the bearings in position, the ends of the sleeve are swedged over at four locations to provide four internally projecting tabs 55, as best seen in FIG. 7.

To be usable in current leaf spring suspension systems, spring shackle bushings must be compact. In the preferred embodiment needle roller bearing elements 41 are used because they provide the requisite strength while fitting well within the space available in current suspension systems. At their outer extremities, the needle roller bearing elements 41 have rolling contact with the inner surfaces of hollow, cylindrical bearing races 30 and 31, as can be seen in FIGS. 4 and 5. The bearing elements contact the shaft 40 at their inner extremity; the shaft forming an inner bearing race. The bearing elements are further maintained in their respective proper positions by the inside and outside bearing race retaining rings 39 and 38. Herein, the illustrated needle roller bearing elements 41 are approximately 1.25 inches long and 0.10 inches in diameter; and a single bearing assembly is comprised of approximately 29 rolling elements. By way of example only, the bearing illustrated is available from Torrington Bearing Company and is called a Draw Cut Bearing, Fully Complete Needle Roller Bearing. Manifestly, the size and shape and number of bearing elements may be varied. Presently, the invention is to be offered in at least three different sizes.

In keeping with the overall emphasis of the present invention on precision machining and hardness, the spring bushing shaft 40 is designed to the same rigid constraints as are the other components. The shaft is an important critical element of a spring shackle bushing; it provides the surface on which relative oscillating motion occurs. In the preferred embodiment, as shown in FIGS. 4, 5, and 8, the spring bushing shaft 40 (also commonly called a spring shackle pin) is a preponderantly solid-section right circular cylindrical body. The shaft, however, includes a lubricant delivery means 42 for delivering lubricant from a grease fitting 43, which is attached via a grease fitting mounting means 44, to a lubricant cavity 47. The spacer 35 is deliberately chosen to have an internal bore wall 35a of a diameter substantially larger than the shaft diameter to provide an annular space with the shaft to hold lubricant. Herein, the lubricant cavity is bounded by the spring bushing shaft 40, the bearing spacer 35 (or other suitable bearing alignment means), and the inside bearing retaining rings 39. The lubricant delivery means 42 is comprised of a centrally oriented 0.25 inch diameter longitudinal duct 45 running parallel to the longitudinal axis of the shaft and a 0.25 inch radial duct 46 oriented perpendicular to the longitudinal duct such that it transmits lubricant from the longitudinal duct to the lubricant cavity. In the preferred embodiment grease is the lubricant of choice, but other dry or liquid lubricants might be made to work equally well. The scope of the preferred embodiment, therefore, includes any suitable lubricant and means for delivery and retention thereof.

For aligning and retaining engagement with the shackle pin retaining bolts 13, 14, 17 and 18, the spring bushing shaft 40 has semicircular notched surfaces 48 whose principal cylindrical axes are perpendicular to the longitudinal axis of the shaft 40. Also, the shaft 40 is machined and polished to the same degree as the other bearing contact surfaces. Herein, it is polished to a 60 to 65 micron standard scale finish and is machined to a roundness tolerance of 0.0005 inch to provide a very smooth and round surface.

The precision grinding and smooth surfaces on the shaft are chosen such that the spacing between the bearing elements and the shaft surface does not exceed 0.002 inch so that there is no large gap or space to cause a vertical pounding of the bearing elements along rough roads.

The pivoted shackle 8 is shown in FIG. 5 and comprises a pair of spaced vertical plates 11 and 12 having split ends defined by slots 60. The upper nut and bolt combinations 17-20 are tightened to close the upper slot to clamp the upper end of the respective plates 11 and 12 to the ends of the shaft 40 of the upper bushing assembly 21b. The lower split ends of the plates 11 and 12 have nuts and bolts assembly 13-16 for closing the lower slot 60 to grip the shaft 40 for the bushing assembly 21c. Rear spring eye 5 of the spring is wrapped about the housing sleeve of this rear, lower bushing assembly 21c.

The rear chassis bracket has a hollow bore 62 with the sleeve press fitted therein as seen in FIG. 4 and held the sleeve is held stationary. The ends of the shaft shown in FIG. 4 project beyond vertical side ends 63 and 64 of the chassis bracket to receive the upper split ends of the plates 11 and 12.

The preceding description and illustration of the present invention make clear that many of the inadequacies of prior art spring shackle bushings have been solved. The lubricant cavity, tight tolerances, roller bearings, materials matched in thermal expansion propensity, and hard and polished surfaces combine to provide a roller bushing cartridge that provides a superior ride for a longer period without scheduled maintenance than do prior art spring shackle bushings. Further, the present invention is an economical solution to what has previously been a serious problem for the trucking industry. As such, the present invention provides a simple and cost efficient alternative to the problems of excessive driver and truck fatigue in both original equipment and retrofit applications.

While in the preferred and illustrated embodiment the shaft is stationary and the outer sleeve turns with spring contraction and expansion relative to the shaft, it is appreciated that this could be reversed with the shaft being turnable and connected to the spring end which would turn with the shaft relative to a stationary sleeve. Also, the bushing assembly has been described in connection with its use in a truck spring suspension; but the bushing assembly is capable of being used to replace other bushings which have oscillatory loads, e.g., a turning pivotal axle for a bucket of a back hoe digging machine.

While a particular embodiment of the present invention has been illustrated and described, those skilled in the art would appreciate that numerous changes and modifications will occur, and the appended claims are intended to cover all those changes and modifications falling within the true spirit and scope of the present invention.

What is claimed Is:

1. A roller bushing assembly for use in a leaf spring suspension system to pivotally support an end of a leaf spring to allow a leaf spring to flex more easily, said roller bushing assembly comprising:
   a housing for the roller bushing assembly having a wall defining a cylindrical hollow internal bore,
   a pair of roller bearings mounted in the bore and having rolling elements,
   an outer race on each of the roller bearings for rolling contact with the internal rolling elements,
   said roller elements each having inner surfaces and defining an internal opening within the roller bearings,
   a shaft mounted in the internal openings in the roller bearings for support and for relative oscillation with rolling surface contact between the inner surfaces on the rolling elements and the shaft,
   a grease means in said housing for retaining grease for lubrication of the rolling elements,
   a precisely machined surface on said shaft machined to predetermined tolerances to have a close fit with the bearing element inner surfaces to reduce road pounding motion therebetween and being highly polished to provide smooth rolling surface engagement with the bearing inner surfaces,
   a precisely machined and highly polished surface on said housing for supporting the outer races of the roller bearings,
   the rolling elements rolling relative to the outer races and said machined shaft surface so that the vehicle suspension load is carried between hard polished machined surfaces with the rolling elements providing a low friction oscillatory movement for the end of the leaf spring to reduce the friction and thereby allow the leaf spring to flex more easily.

2. A roller bushing assembly in accordance with claim 1 including a hollow passageway in the shaft for delivery of grease to the grease means in the housing.

3. A roller bushing assembly in accordance with claim 1 including a spacer within the hollow bore of the housing positioned between a pair of roller bearings and providing a space between the roller bearings to define the grease means for retaining the grease.

4. A roller bushing assembly in accordance with claim 1 in which said housing is a sleeve having the hollow bore with opposite ends adjacent outer edges of the respective roller bearings, and seals at the ends of the sleeve for keeping out foreign material and for retaining lubricant within the sleeve.

5. A roller bushing assembly in accordance with claim 1 in which the sleeve is formed of bearing metal, said sleeve and said outer race acting as a composite outer race for the bearings.

6. A roller bushing assembly in accordance with claim 1 in which means on the shaft are provided to align and fix the shaft so that the bearing elements roll about the precisely-machined and stationary surface on the shaft.

7. A roller bushing assembly for use in a mechanism having an oscillating motion, said roller bushing assembly comprising:

- a sleeve for the roller bushing assembly having a wall defining a cylindrical hollow internal bore,
- a pair of roller bearings mounted in the bore and having rolling elements,
- an outer race on each of the roller bearings having a hard finished inner cylindrical surface for rolling contact with the internal rolling elements,
- said roller elements each having inner surfaces and defining an internal opening within the roller bearings,
- a shaft mounted in the internal openings in the roller bearings for support and for relative oscillation with rolling surface contact between the inner surfaces on the rolling elements and the shaft
- a grease means in said housing for retaining grease for lubrication of the rolling elements,
- a precisely machined surface on said shaft machined to predetermined tolerances to have a close fit with the bearing element inner surfaces and being highly polished to provide smooth rolling surface engagement with the bearing inner surfaces,
- precisely machined and highly polished inner and outer surfaces on said housing with the inner surface supporting the outer races of the roller bearings,
- the rolling elements rolling relative to the outer races and said machined shaft surface so that the oscillating load is carried between hard polished machined surfaces with the rolling elements having a low friction oscillatory movement.

8. A roller bushing assembly in accordance with claim 7 in which the sleeve is formed from a hard steel matched to the bearing races so that the sleeve and races serve as a composite race for the bearing elements.

9. A roller bushing assembly in accordance with claim 8 in which a spacer is positioned in the internal bore of the sleeve to abut and hold the pair of bearings spaced from each other,

- said spacer being annular in shape and having an inner wall spaced from the shaft to define the grease means,
- said shaft having a hollow passageway therein for delivery of grease to the grease means.

* * * * *